United States Patent [19]

Taniai et al.

[11] Patent Number: 5,043,935
[45] Date of Patent: Aug. 27, 1991

[54] DATA TRANSFER SYSTEM FOR REARRANGING DATA UNITS USING INTERMEDIATE TEMPORARY REGISTERS

[75] Inventors: Takayoshi Taniai; Tadashi Saitoh, both of Kawasaki; Yasuhiro Tanaka, Koshigaya, all of Japan

[73] Assignee: Fujitsu Limited, Kawasaki, Japan

[21] Appl. No.: 318,282

[22] Filed: Mar. 3, 1989

[30] Foreign Application Priority Data

Mar. 4, 1988 [JP] Japan ................................. 63-51223

[51] Int. Cl.⁵ .......................... G06F 7/00; G06F 13/00
[52] U.S. Cl. .................................. 364/900; 364/964;
364/964.4; 364/964.5; 364/964.6; 364/939;
364/927.97; 364/927.99; 364/933.3
[58] Field of Search ... 364/200 MS File, 900 MS File;
370/60; 340/825.21

[56] References Cited

U.S. PATENT DOCUMENTS

| 4,188,664 | 2/1980 | DeShon | 364/200 |
|---|---|---|---|
| 4,309,755 | 1/1982 | Lanty | 364/200 |
| 4,414,620 | 11/1983 | Tsuchimoto et al. | 364/200 |
| 4,473,879 | 9/1984 | Tachiuchi et al. | 364/200 |
| 4,514,823 | 4/1985 | Mendelson et al. | 364/200 |
| 4,591,973 | 5/1986 | Ferris, III et al. | 364/200 |
| 4,607,328 | 2/1986 | Furukawa et al. | 364/200 |
| 4,630,230 | 12/1986 | Sundet | 364/200 |
| 4,807,121 | 2/1989 | Halford | 364/200 |
| 4,855,900 | 8/1989 | Simpson et al. | 364/200 |
| 4,903,018 | 2/1990 | Wiebach et al. | 341/51 |
| 4,931,925 | 6/1990 | Utsumi et al. | 364/200 |

FOREIGN PATENT DOCUMENTS

WO86/00431 1/1986 PCT Int'l Appl. .
WO86/00436 1/1986 PCT Int'l Appl. .

OTHER PUBLICATIONS

IBM Technical Disclosure Bulletin, vol. 26, No. 10A, Mar. 1984, "Direct Memory Access Controller", pp. 5199-5206.
Electronic Design, vol. 33, No. 12, May, 1985, "68020 Dynamically Adjusts its Data Transfers to Match Peripheral Ports", pp. 219-225.

Primary Examiner—Michael R. Fleming
Assistant Examiner—Gopal C. Ray
Attorney, Agent, or Firm—Armstrong, Nikaido, Marmelstein, Kubovcik & Murray

[57] ABSTRACT

A data transfer control system controls a data transfer between a source and a destination by rearranging a data arrangement of a data which is made up of data units each made up of one or a plurality of bits, and comprises an input/output interface unit for inputting the data from the source and for outputting the data to the destination, a data swap circuit coupled to the input/output interface unit for rearranging a data arrangement of the data received from the source through the input/output interface unit in terms of the data unit and for rearranging a data arrangement of the data outputted to the destination through the input/output interface unit in terms of the data unit, a temporary register for temporarily storing the data with the rearranged data arrangement obtained from the data swap circuit, and a data swap control circuit coupled to the data swap circuit for controlling the rearranging of the data arrangement in the data swap circuit responsive to a transfer information which includes at least a source address, a destination address and a transfer control information.

14 Claims, 11 Drawing Sheets

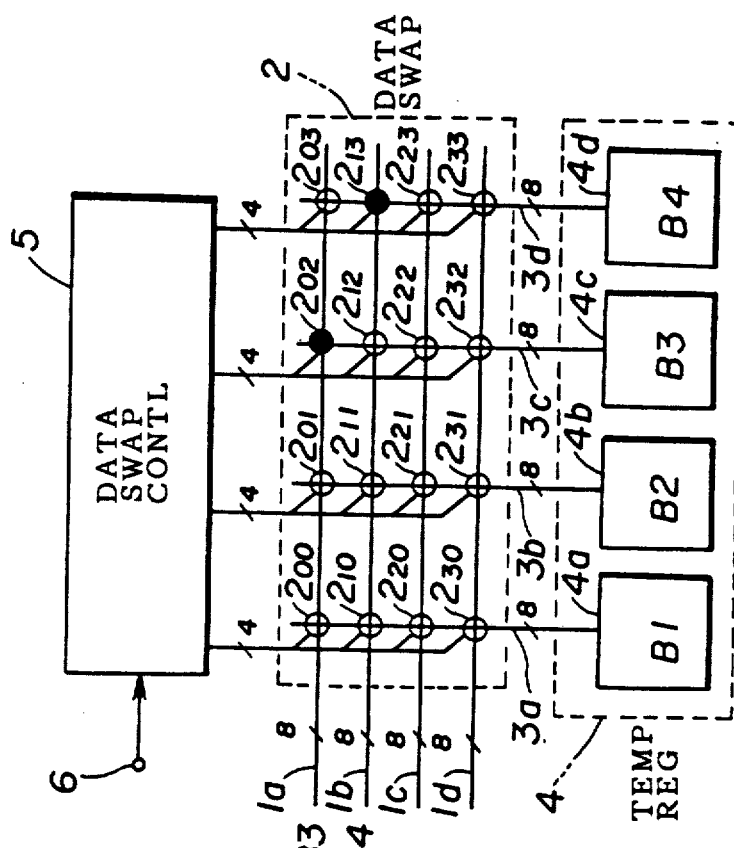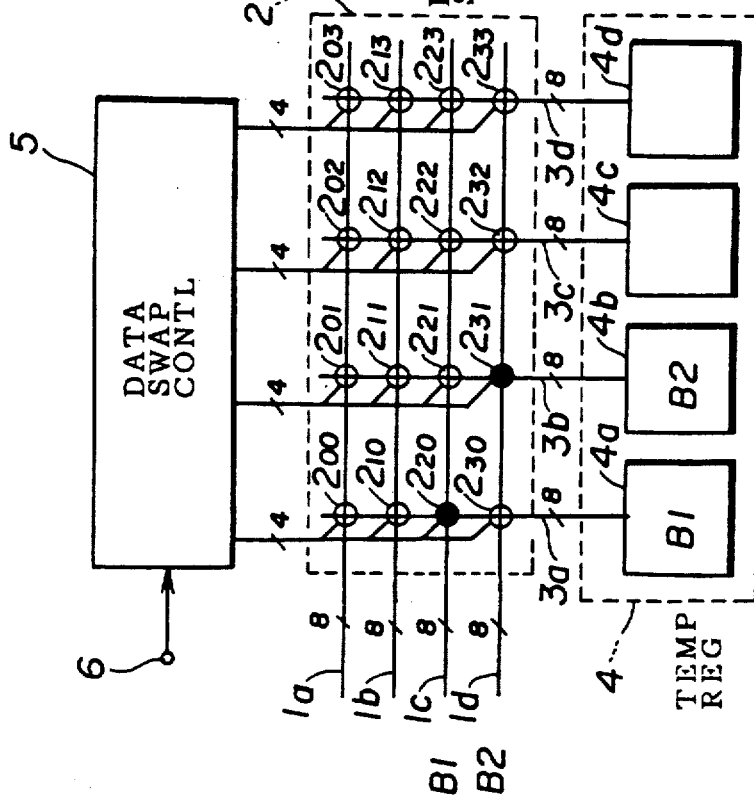

DATA TRANSFER SYSTEM FOR REARRANGING DATA UNITS USING INTERMEDIATE TEMPORARY REGISTERS

BACKGROUND OF THE INVENTION

The present invention generally relates to data transfer control systems, and more particularly to a data transfer control system for controlling a data transfer which involves a rearrangement of data.

When making a data transfer between two regions such as when transferring data from an 8-bit input/output interface to a 16-bit memory device, it is necessary to rearrange the data.

Conventionally, as methods of making the rearrangement of data, there is a first method which employs a swap buffer and a second method which employs a temporary register. According to the first method, first 8 bits of data from an input/output interface is transferred to upper 8 bits of a 16-bit memory device, and next 8 bits of data is transferred to lower 8 bits of the memory device through a swap buffer. On the other hand, according to the second method, 8 bits of data from the input/output interface is transferred to upper 8 bits of a 16-bit temporary register, and next 8 bits of data are transferred to lower 8 bits of the temporary register. Then, the 16-bits of data from the temporary register is transferred to the 16-bit memory device.

The second method employing the temporary register requires two cycles which are a source cycle in which the data is transferred from the input/output interface (a source) to the temporary register and a destination cycle in which the data is transferred from the temporary register to the memory device (a destination). When the temporary register is employed, there is an advantage in that a start address can be set independently at the source and the destination thereby enabling a flexible rearrangement of the data.

However, in recent microcomputer systems, a bus width is extended to 32 bits, for example, and there is a need to transfer 32 bits of data. When making a data transfer between 32-bit source and the destination memories by use of a 32-bit bus, it is possible to set four kinds of start addresses at both the source and destination memories by using lower 2 bits of the address. In other words, start addresses "00", "01", "10" and "11" can be set by the lower 2 bits of the address.

For this reason, according to the second method which employs the temporary register and makes the rearrangement of the data in either one of the source and destination cycles, there are sixteen possible combinations of the start addresses because there are four possible kinds of start addresses at both the source and destination memories. As a result, sixteen kinds of control information must be provided with respect to the temporary register for making the rearrangement of the data, and there is a problem in that a control of the data transfer becomes complex.

SUMMARY OF THE INVENTION

Accordingly, it is a general object of the present invention to provide a novel and useful data transfer control system in which the problems described heretofore are eliminated.

Another and more specific object of the present invention is to provide a data transfer control system for controlling a data transfer between a source and a destination by rearranging the data arrangement of data which is made up of data units each made up of one or a plurality of bits. The data transfer control system comprises input/output means for inputting the data from the source and for outputting the data to the destination, a data swap circuit coupled to said input/output means for rearranging the data arrangement of the data received from the source through said input/output means in terms of the data unit and for rearranging a data arrangement of the data outputted to the destination through said input/output means in terms of the data unit, a temporary register for temporarily storing the data with the rearranged data arrangement obtained from said data swap circuit, and a data swap control circuit coupled to said data swap circuit for controlling the rearranging of the data arrangement in said data swap circuit responsive to transfer information. The transfer information includes at least a source address, a destination address and transfer control information. The data swap control circuit controls said data swap circuit to rearrange the data from the source into a standard arrangement in terms of the data unit to be stored in said temporary register regardless of a start address of the data received from the source and to supply the destination the data in the standard arrangement stored in said temporary register in a predetermined sequence in terms of the data unit dependent on a start address of the data in the destination. According to the data transfer control system of the present invention, the quantity of control information required for the data transfer is small and the control of the data transfer is simple. As a result, it is possible to reduce the hardware required for the control of the data transfer and also increase the speed of the control.

Still another object of the present invention is to provide a data transfer control system adapted to a direct memory access controller for controlling a data transfer between a source and a destination by rearranging a data arrangement of data which is made up of data units each made up of one or a plurality of bits. The data transfer control system comprises input/output means for inputting the data from the source and for outputting the data to the destination, a data swap circuit coupled to said input/output means for rearranging a data arrangement of the data received from the source through said input/output means in terms of the data unit and for rearranging a data arrangement of the data outputted to the destination through said input/output means in terms of the data unit, a temporary register for temporarily storing the data with the rearranged data arrangement obtained from said data swap circuit, and a data swap control circuit coupled to said data swap circuit for controlling the rearranging of the data arrangement in said data swap circuit responsive to a transfer information. The transfer information includes at least a source address, a destination address and a transfer control information. The data swap control circuit controls said data swap circuit to rearrange the data from the source into a standard arrangement in terms of the data unit to be stored in said temporary register regardless of a start address of the data received from the source and to supply to the destination the data in the standard arrangement stored in said temporary register in a predetermined sequence in terms of the data unit dependent on a start address of the data in the destination.

Other objects and further features of the present invention will be apparent from the following detailed description when read in conjunction with the accompanying drawings.

BRIEF DESCRIPTION OF THE DRAWINGS

FIGS. 5A through 5D are schematic diagrams for explaining the transfer of data according to sequences 1) through 8);

DETAILED DESCRIPTION

Figure 1:
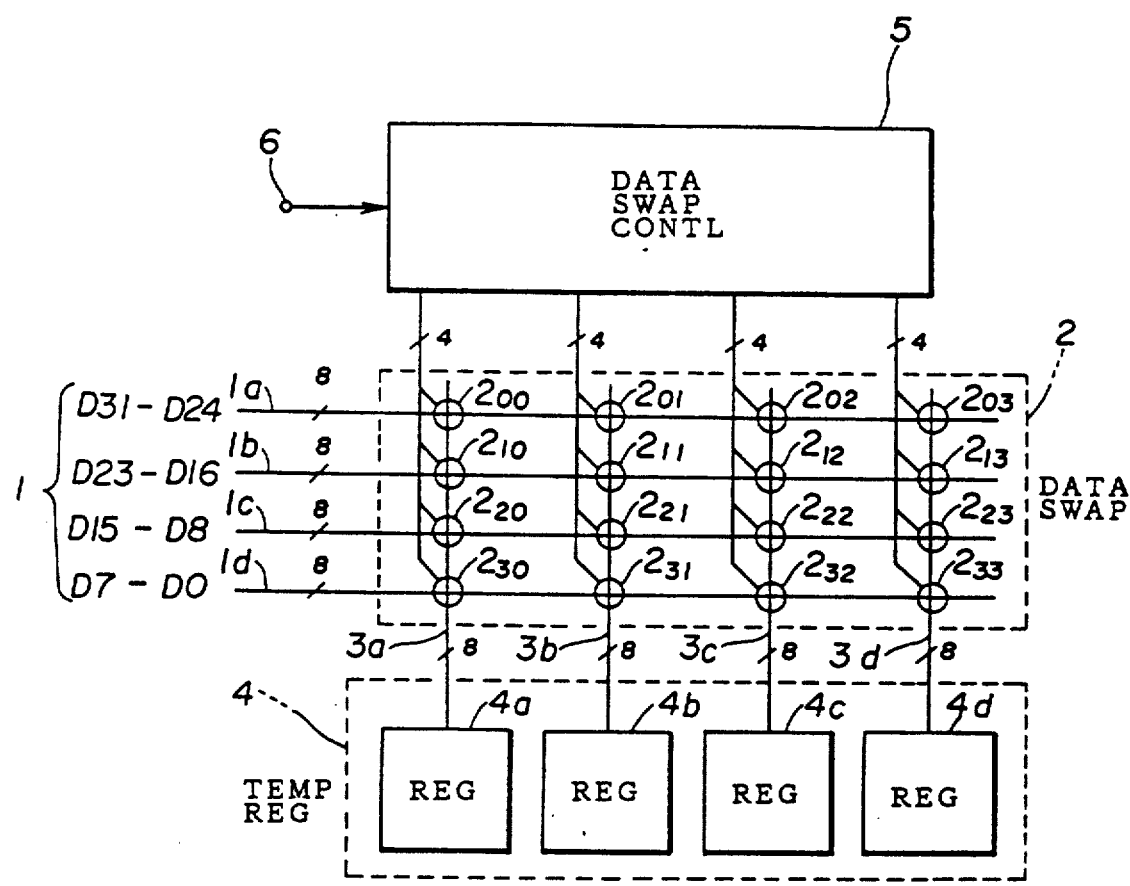
FIG. 1 is a system block diagram showing an essential part of a data transfer control system according to the present invention.

FIG. 1 shows an embodiment of the data transfer control system according to the present invention. In FIG. 1, an external data bus 1 has 8-bit buses 1a through 1d, and this external data bus 1 is coupled to an external input/output interface (not shown), a memory device (not shown) and the like. A data swap circuit 2 has sixteen gate circuits $2_{00}$ through $2_{33}$ which are arranged in a matrix arrangement at intersections of the buses 1a through 1d and 8-bit buses 3a through 3d.

Figure 2:
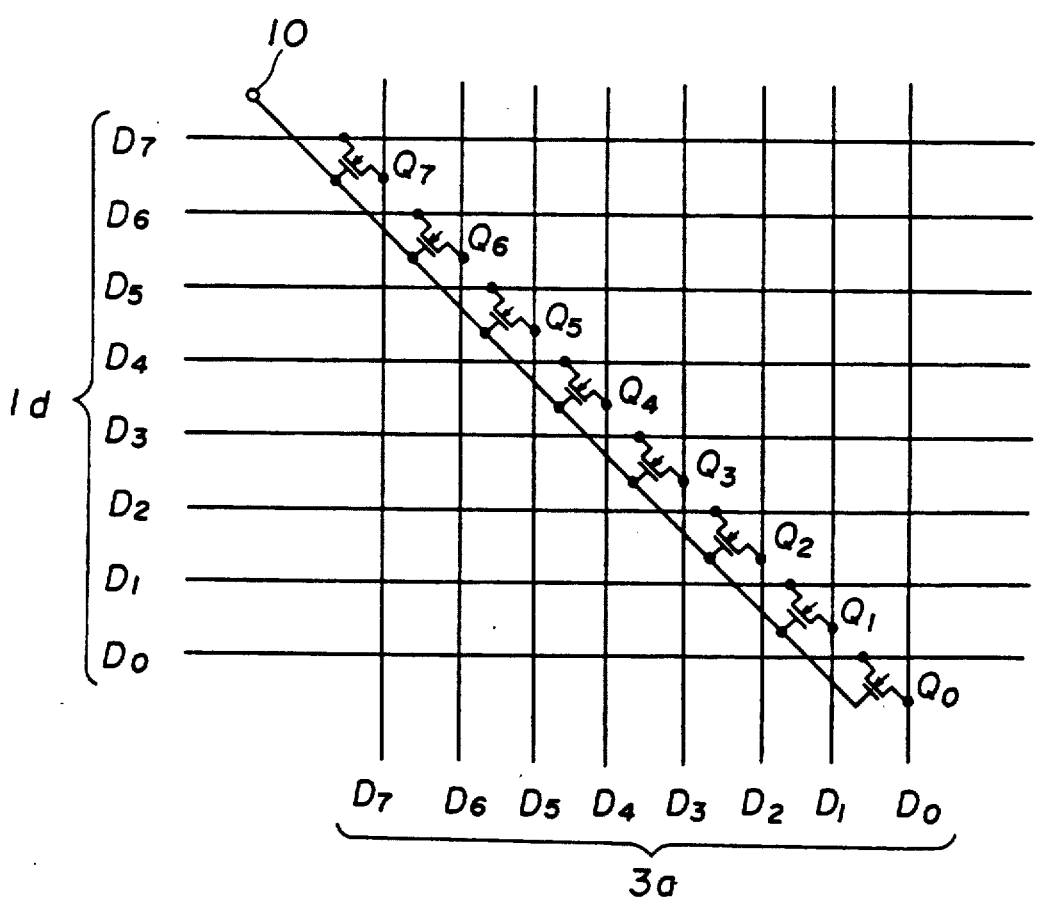
FIG. 2 is a system circuit diagram showing an embodiment of a gate circuit of the data transfer control system shown in FIG. 1.

The gate circuit $2_{30}$ has a circuit construction shown in FIG. 2. Between data lines D0 through D7 of the bus 1d and data lines D0 through D7 of the bus 3a in FIG. 2, metal oxide semiconductor (MOS) transistors Q0 through Q7 are provided in such a manner that a MOS transistor Qi is coupled between a data line Di of the bus 1d and a data line Di of the bus 3a, where i=0, 1, ..., 7. The MOS transistors Q0 through Q7 are respectively supplied with a 1-bit control signal from a data swap control circuit 5 through a terminal 10, and the MOS transistors Q0 through Q7 turn ON when this control signal has a high level so as to connect the buses 1a and 3a. The other gate circuits $2_{00}$ through $2_{23}$ and $2_{31}$ through $2_{33}$ have the same circuit construction as the gate circuit $2_{30}$.

The buses 3a through 3d are respectively coupled to 8-bit registers 4a through 4d which constitute a temporary register 4.

A central processing unit (CPU, not shown) supplies addresses of a source and a destination, a data length, and a transfer mode to the data swap control circuit 5 through a terminal 6. The data swap control circuit 5 generates a 16-bit gate control signal based on the information received through the terminal 6 and supplies each bit of the gate control signal to the gate circuits $2_{00}$ through $2_{33}$ of the data swap circuit 2.

Figure 3:
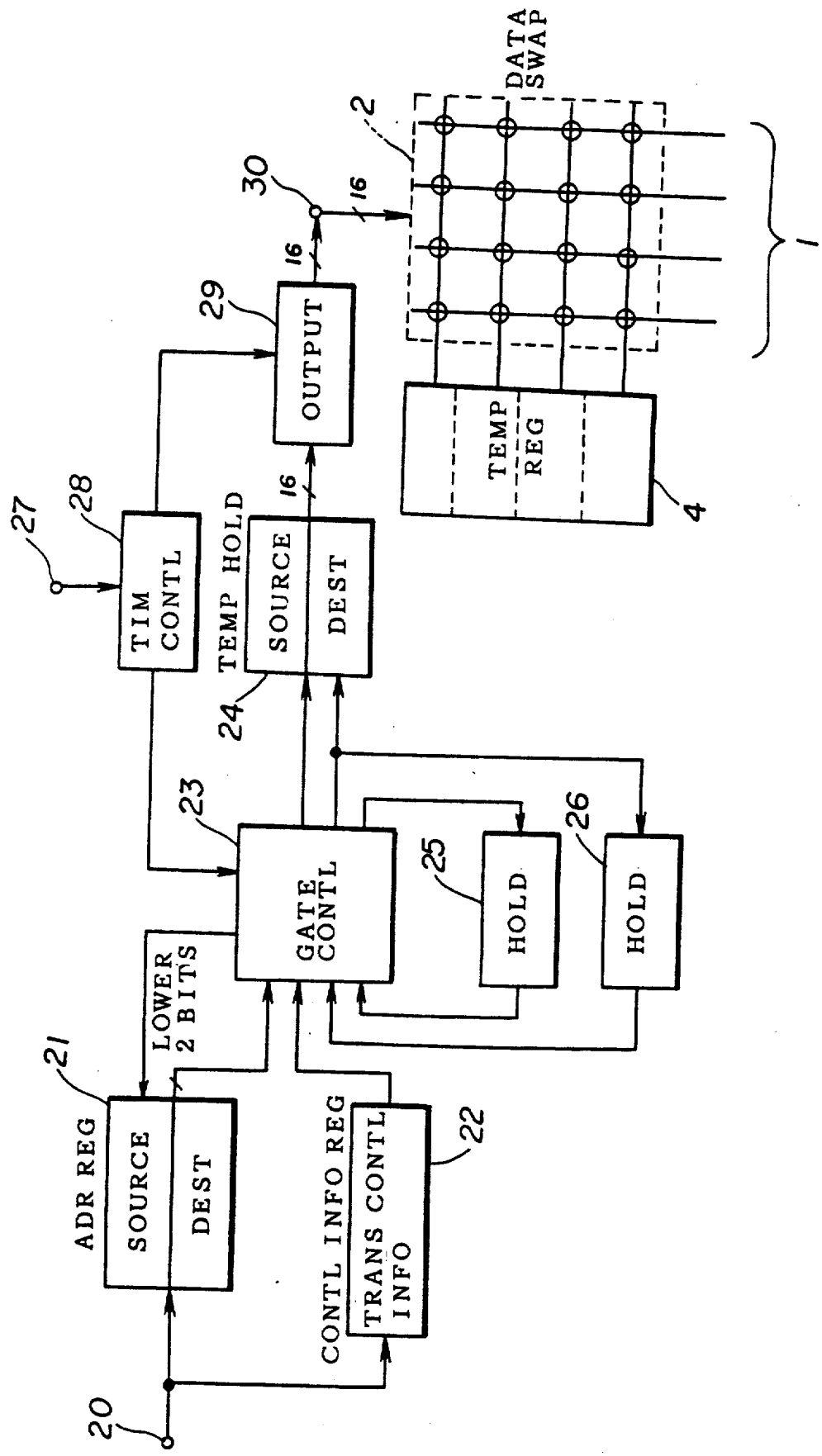
FIG. 3 is a system block diagram showing an embodiment of a data swap control circuit of the data transfer control system shown in FIG. 1.

The data swap control circuit 5 has a construction shown in FIG. 3. In FIG. 3, source and destination addresses and transfer control information from the CPU are applied to a terminal 20. By an initial setting, the source address and the destination address are stored in an address register 21, while the transfer control information such as the data length of the data which is to be transferred, the transfer mode and whether the address is to be incremented or decremented are stored in a control information register 22.

Figure 4A:
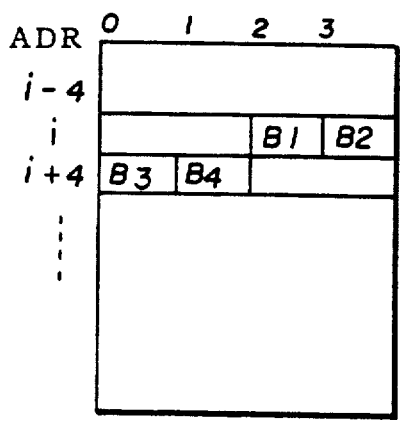
FIGS. 4A through 4C are diagrams for explaining a rearrangement of data.
Figure 4B:
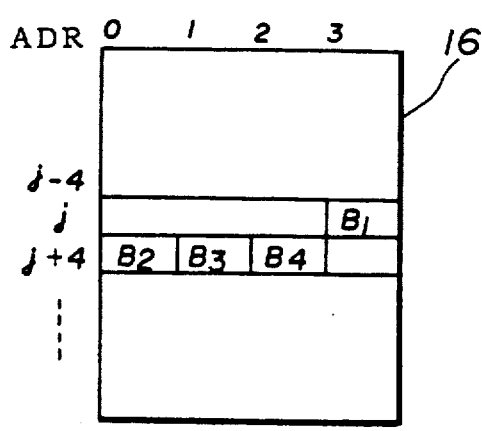

When it is assumed for convenience' sake that a start address is i+2 in a 32-bit source memory 15 shown in FIG. 4A and a start address is j+3 in a 32-bit destination memory 16 shown in FIG. 4B, lower 2 bits of the source address stored in the address register 21 is "10" and lower 2 bits of the destination address stored in the address register 21 is "11".

The lower 2 bits of both the source and destination addresses stored in the address register 21 and the transfer control information stored in the control information register 22 are supplied to a gate control circuit 23 which is made up of a programmable logic array (PLA). The gate control circuit 23 in this case operates in the following sequence.

Sequence 1)

The gate control circuit 23 carries out a control so that a 16-bit gate control signal of the first source cycle for making only the gate circuits $2_{20}$ and $2_{31}$ conductive and a 16-bit gate control signal of the first destination cycle for making only the gate circuit $2_{30}$ conductive are held in a temporary holding circuit 24. In addition, the transfer control information indicating the transfer frequency which is "first" and the transfer direction which is "source direction" are respectively held in a frequency information holding circuit 25 and a transfer direction information holding circuit 26. The transfer frequency indicates a number of times the data transfer is made, and the transfer direction indicates a direction in which the data transfer is made.

Sequence 2)

When a transfer request signal is received at a terminal 27, a clock signal generated from a timing control circuit 28 is supplied to the gate control circuit 23 and an output circuit 29. Because the transfer direction is the source direction in the above described sequence 1), the 16-bit gate control signal of the source cycle is supplied to the output circuit 29 from the source side of the temporary holding circuit 24. The 16-bit control signal supplied to the output circuit 29 is outputted in parallel from a terminal 30 in synchronism with the clock signal and supplied to the data swap circuit 2. Accordingly, the gate circuits $2_{20}$ and $2_{31}$ become conductive and data B1 and B2 which are read out from the memory 15 and supplied to the buses 1c and 1d are respectively stored in the registers 4a and 4b of the temporary register 4 as shown schematically in FIG. 5A. In addition, a value stored in the source side of the address register 21 is incremented by four but the lower two bits thereof remain unchanged. In FIGS. 5A through 5D, 6A through 6D, 7A and 7D which will be described later, a gate circuit which is made conductive is indicated by a black circular mark while a gate circuit which is not made conductive is indicated by a white circular mark.

Sequence 3)

At the same time, the gate control circuit 23 refers to the frequency information and the transfer direction information respectively obtained from the holding circuits 25 and 26, and carries out a control so that a 16-bit gate control signal of the second source cycle for making only the gate circuits $2_{02}$ and $2_{13}$ conductive is held in the source side of the temporary holding circuit 24 and the frequency information which is "second" is held in the frequency information holding circuit 25.

Sequence 4)

Responsive to a next clock signal, the gate circuits $2_{02}$ and $2_{13}$ become conductive and data B3 and B4 from the buses 1a and 1b are respectively stored in the registers 4c and 4d as shown schematically in FIG. 5B.

Sequence 5)

At the same time, the gate control circuit 23 carries out a control so that the information "first" and "destination direction" are respectively held in the holding circuits 25 and 26 as the transfer frequency and the transfer direction. In addition, at the same time, a 16-bit gate control signal for making the gate circuits $2_{20}$ and $2_{31}$ conductive is held in the source side of the temporary holding circuit 24.

Sequence 6)

Responsive to a next clock signal, only the gate circuit $2_{30}$ becomes conductive in response to a gate control signal which is outputted from the destination side of the temporary holding circuit 24. Thus, the data B1 stored in the register 4a is read out and supplied to the memory 16 through the bus 1d as shown schematically in FIG. 5C. The data B1 is stored at the address j+3 of the memory 16.

Sequence 7)

At the same time, the gate control circuit 23 carries out a control so that a 16-bit gate control signal for making only the gate circuits $2_{01}$, $2_{12}$ and $2_{23}$ conductive is held in the destination side of the temporary holding circuit 24 and the frequency information which is "second" is held in the holding circuit 25.

Sequence 8)

The gate circuits $2_{01}$, $2_{12}$ and $2_{23}$ become conductive responsive to the next clock signal, and the data B2, B3 and B4 stored in the registers 4b, 4c and 4d are supplied to the memory 16 through the respective buses 1a, 1b and 1c as shown schematically in FIG. 15D and successively written from the address j+4. At the same time, a 16-bit gate control signal for making the gate circuit $2_{30}$ conductive is held in the destination side of the temporary holding circuit 24 and the information "first" and "source direction" are respectively held in the holding circuits 25 and 26 as the transfer frequency and the transfer direction.

Thereafter, the operation returns to the sequence 2), and the data transfer amounting to the data length is made by repeating the sequences 2) through 8).

Figure 4C:
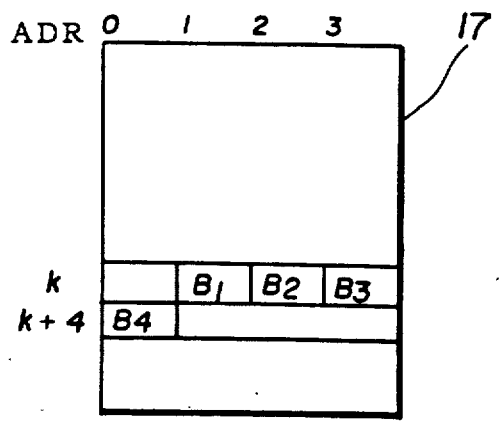
Figure 5D:
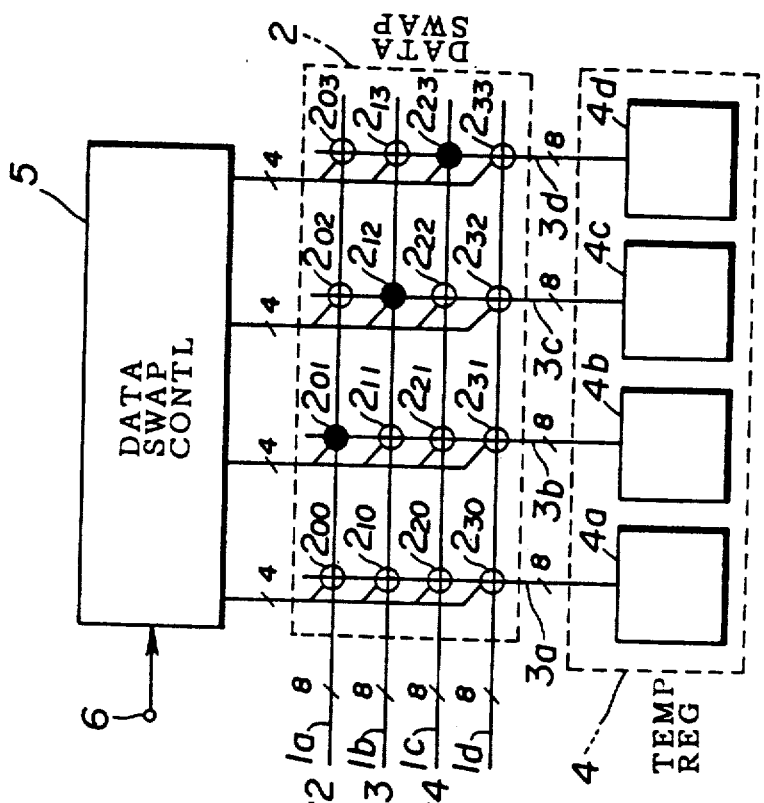
Figure 5C:
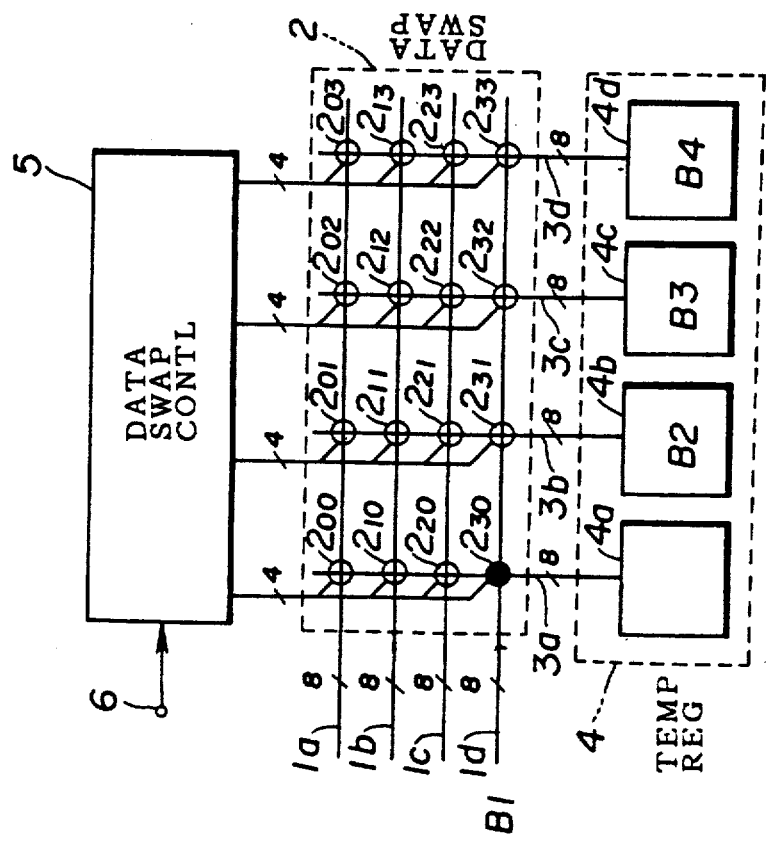

In addition, when the source is the input/output interface coupled to the bus 1c and the destination is the 32-bit memory 17 shown in FIG. 4C wherein the start address is k+1, the lower two bits of the address stored in the source side of the address register 21 is set to "10" and the lower two bits of the address stored in the destination side of the address register 21 is set to "01" responsive to the address from the CPU. Furthermore, other transfer control information is stored in the control information register 22. In this case, the gate control circuit 23 operates in the following sequence.

Sequence 1]

The gate control circuit 23 carries out a control so that a gate control signal of the source cycle for making only the gate circuit $2_{20}$ conductive and a gate control signal of the destination cycle for making only the gate circuits $2_{10}$, $2_{21}$ and $2_{32}$ conductive are held in the temporary holding circuit 24 and the transfer frequency which is "first" and the transfer direction which is "source direction" are respectively held in the holding circuits 25 and 26.

Sequence 2]

When the transfer request signal is received at the terminal 27 and the gate control circuit 23 receives the clock signal, a gate control signal is outputted from the source side of the temporary holding circuit 24. Only the gate circuit $2_{20}$ becomes conductive and the first 8-bit data B1 is stored in the register 4a through the bus 1c as shown schematically in FIG. 6A.

Sequence 3]

At the same time, the gate control circuit 23 carries out a control so that a gate control signal for making only the gate circuit $2_{21}$ conductive is held in the source side of the temporary holding circuit 24 and the frequency information "second" is held in the frequency information holding circuit 25.

Sequence 4]

Figure 6A:
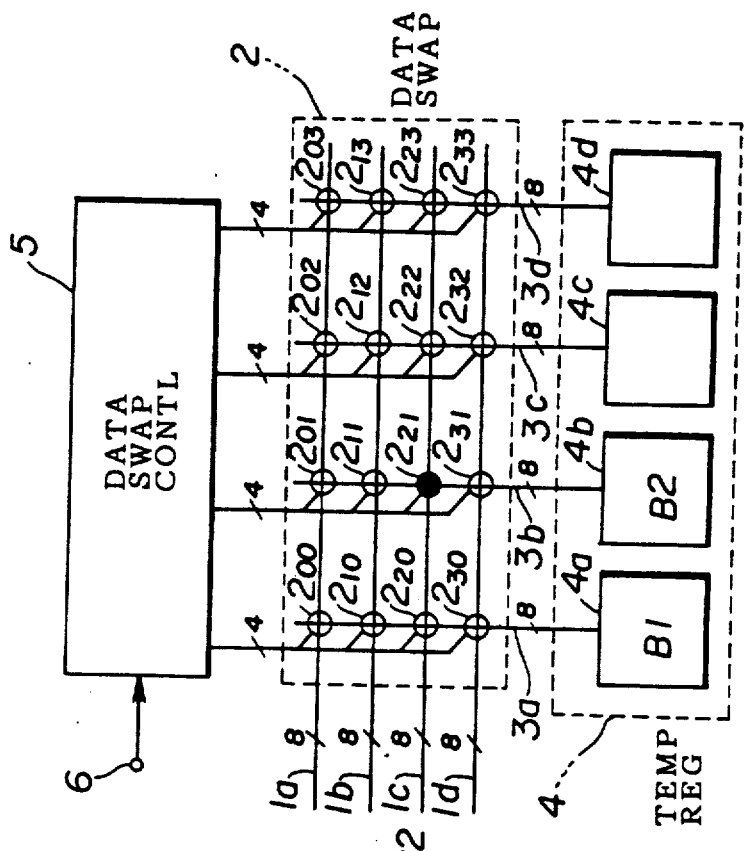
FIGS. 6A through 6D, 7A and 7B are schematic diagrams for explaining the transfer of data according to sequences 1] through 13]
Figure 6B:
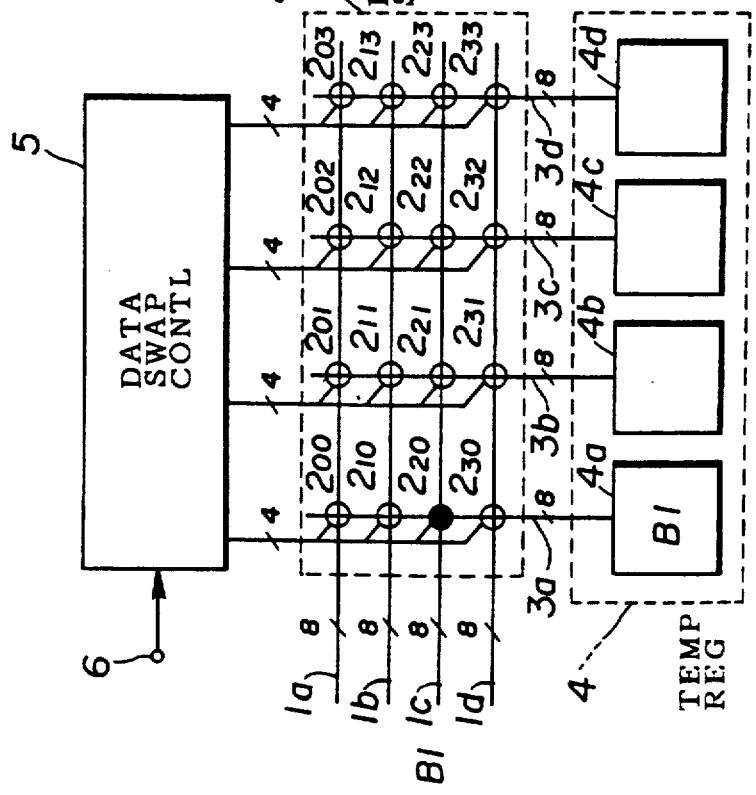

Responsive to the next clock signal, only the gate circuit $2_{21}$ becomes conductive in response to a gate control signal which is outputted from the source side of the temporary holding circuit 24, and the data B2 from the bus 1c is stored in the register 4b as shown schematically in FIG. 6B.

Sequence 5]

At the same time, the gate control circuit 23 carries out a control so that a gate control signal for making only the gate circuit $2_{22}$ conductive is held in the source side of the temporary holding circuit 24, and the frequency information "third" is held in the frequency information holding circuit 25.

Sequence 6]

Figure 6C:
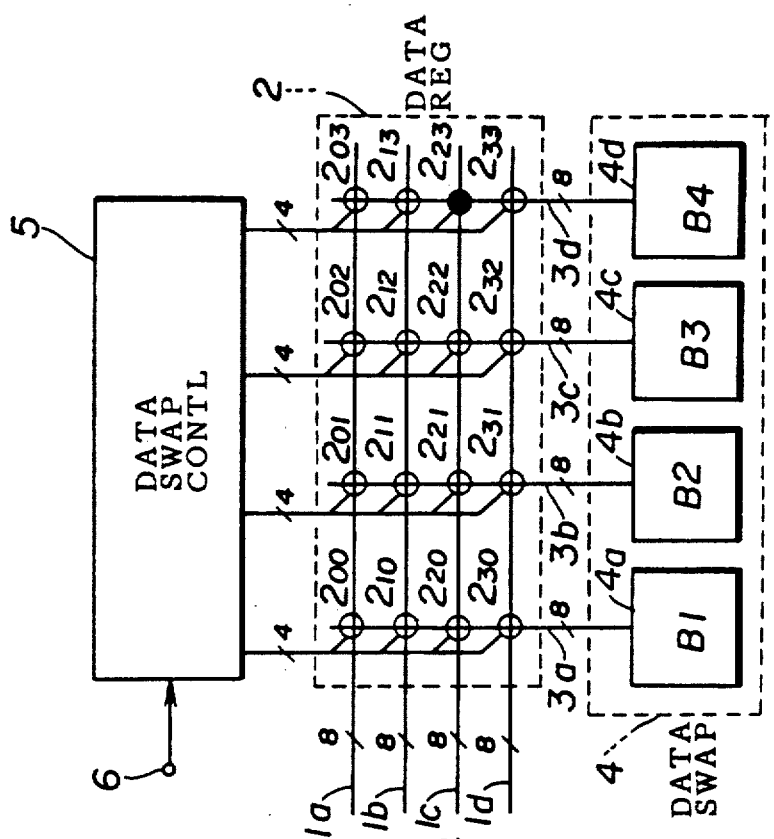

Only the gate circuit 222 becomes conductive in response to a gate control signal outputted from the source side of the temporary holding circuit 24 responsive to the next clock signal, and the data B3 from the bus 1c is stored in the register 4c as shown schematically in FIG. 6C.

Sequence 7]

At the same time, the gate control circuit 23 carries out a control so that a gate control signal for making only the gate circuit $2_{23}$ conductive is held in the source side of the temporary holding circuit 24, and the frequency information "fourth" is held in the frequency information holding circuit 25.

Sequence 8]

Figure 6D:
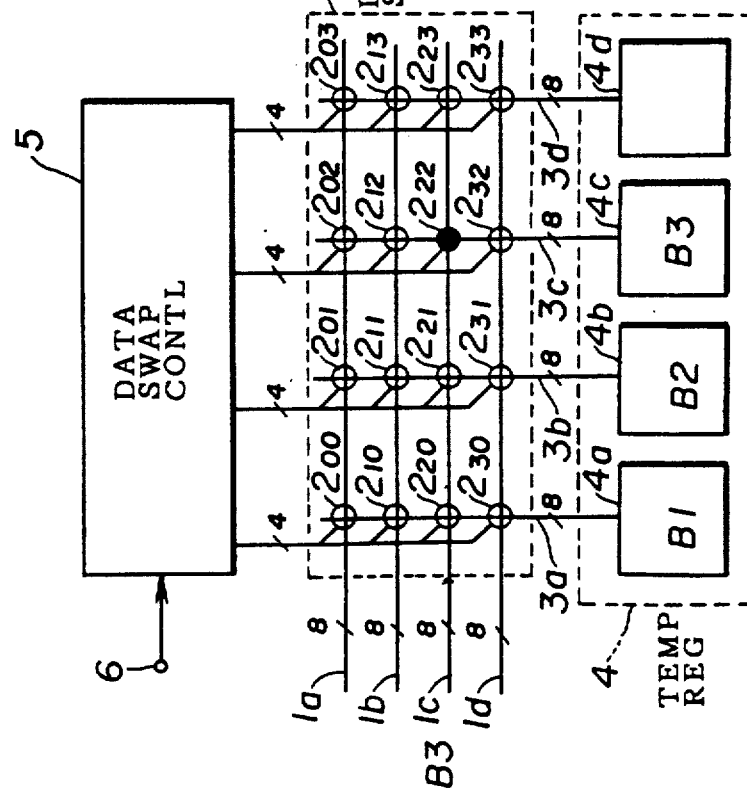

Responsive to the next clock signal, only the gate circuit $2_{23}$ becomes conductive in response to a gate control signal outputted from the source side of the temporary holding circuit 24, and the data B4 from the bus 1c is stored in the register 4d as shown schematically in FIG. 6D.

Sequence 9]

At the same time, the gate control circuit 23 carries out a control so that a gate control signal for making only the gate circuit $2_{20}$ conductive is held in the source side of the temporary holding circuit 24. In addition, the frequency information which is "first" and the transfer direction which is "destination direction" are respectively held in the holding circuits 25 and 26.

Sequence 10]

Figure 7A:
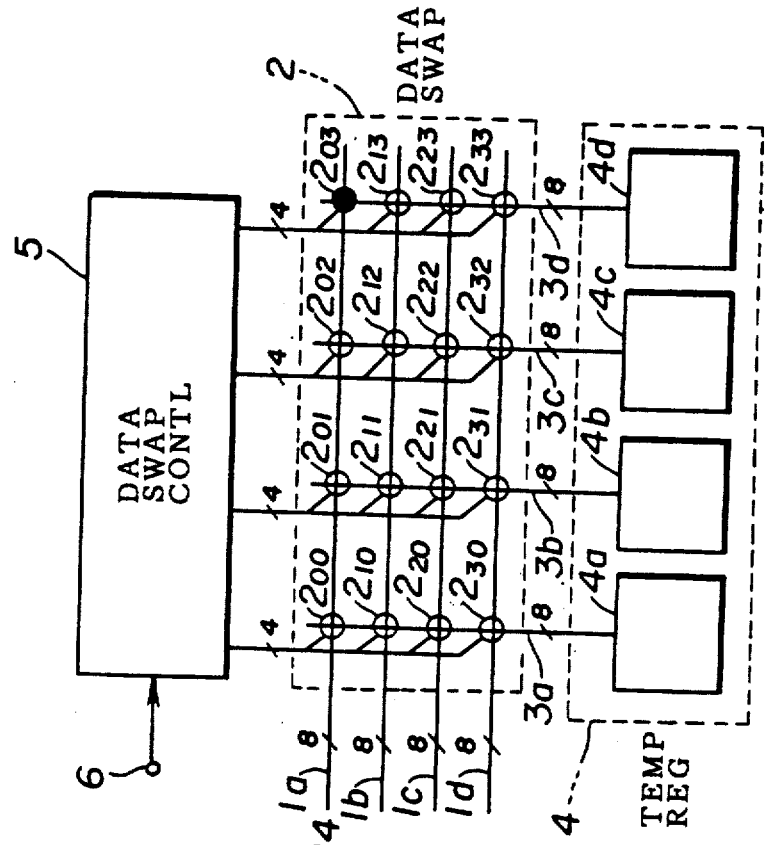

Responsive to the next clock signal, only the gate circuits $2_{10}$, $2_{21}$ and $2_{32}$ become conductive in response to a gate control signal outputted from the destination side of the temporary holding circuit 24 as shown schematically in FIG. 7A. The data B1, B2 and B3 stored in the registers 4a, 4b and 4c are respectively supplied to the memory 17 through the buses 1b, 1c and 1d and written in a region of three bytes starting from an address k+1.

Sequence 11]

At the same time, the gate control circuit 23 carries out a control so that a gate control signal for making only the gate circuit $2_{03}$ conductive is held in the destination side of the temporary holding circuit 24, and the frequency information "second" is held in the frequency information holding circuit 25.

Sequence 12]

Figure 7B:
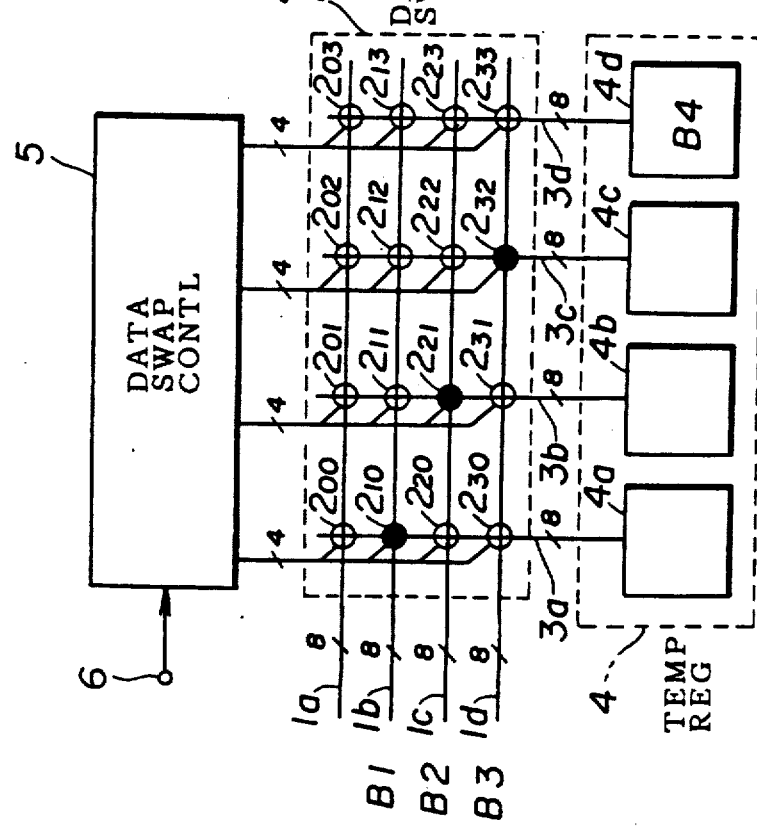

Responsive to the next clock signal, only the gate circuit $2_{03}$ becomes conductive in response to a gate control signal outputted from the destination side of the temporary holding circuit 24 as shown schematically in FIG. 7B. The data B4 stored in the register 4d is supplied to the memory 17 through the bus 1a and written at an address k+4.

Sequence 13]

At the same time, the gate control circuit 23 carries out a control so that a gate control signal for making only the gate circuits $2_{10}$, $2_{21}$ and $2_{32}$ conductive is held in the destination side of the temporary holding circuit 24. The frequency information which is "first" and the transfer direction which is "source direction" are respectively held in the holding circuits 25 and 26.

Thereafter, the operation returns to the sequence 2] and the data transfer amounting to the data length is made by repeating the sequences 2] through 13].

As described heretofore, the source cycle and the destination cycle are independent, and the data are stored in the registers 4a through 4d of the temporary register 4 in such a standard arrangement that the address value successively increases. Accordingly, when making a data transfer between two 32-bit memories, four kinds of start addresses (lower two bits which are "00", "01", "10" and "11") can be set at both the source and the destination memories. There are four kinds of start addresses of the source cycle because the data are first arranged in the standard arrangement within the temporary register 4 regardless of the start address, and there are four kinds of start addresses of the destination cycle since the data in the standard arrangement are transferred from the temporary register 4 in a sequence dependent on the start address of the destination cycle. Hence, only eight (4+4=8) kinds of start addresses are possible. In other words, only eight kinds of control information are required and this is ½ the number of kinds of control information required in the conventional data transfer control system. But according to the conventional data transfer control system, there are four kinds of start addresses of the source cycle and there are four possible kinds of start addresses of the destination cycle with respect to each start address of the source cycle. This means that sixteen (4×4=16) kinds of start addresses are possible in the conventional data transfer control system and sixteen kinds of control information are required. As a result, the control of the data transfer according to this embodiment is considerably simplified compared to the conventional data transfer control system.

Therefore, according to this embodiment, the data B1 through B4 are respectively stored in the registers 4a through 4d of the temporary register 4 in the standard arrangement during the source cycle regardless of the start address of the source, and the data B1 through B4 in the standard arrangement are read out from the registers 4a through 4d and supplied to the destination in a predetermined sequence which is dependent on the start address of the destination.

Figure 8:
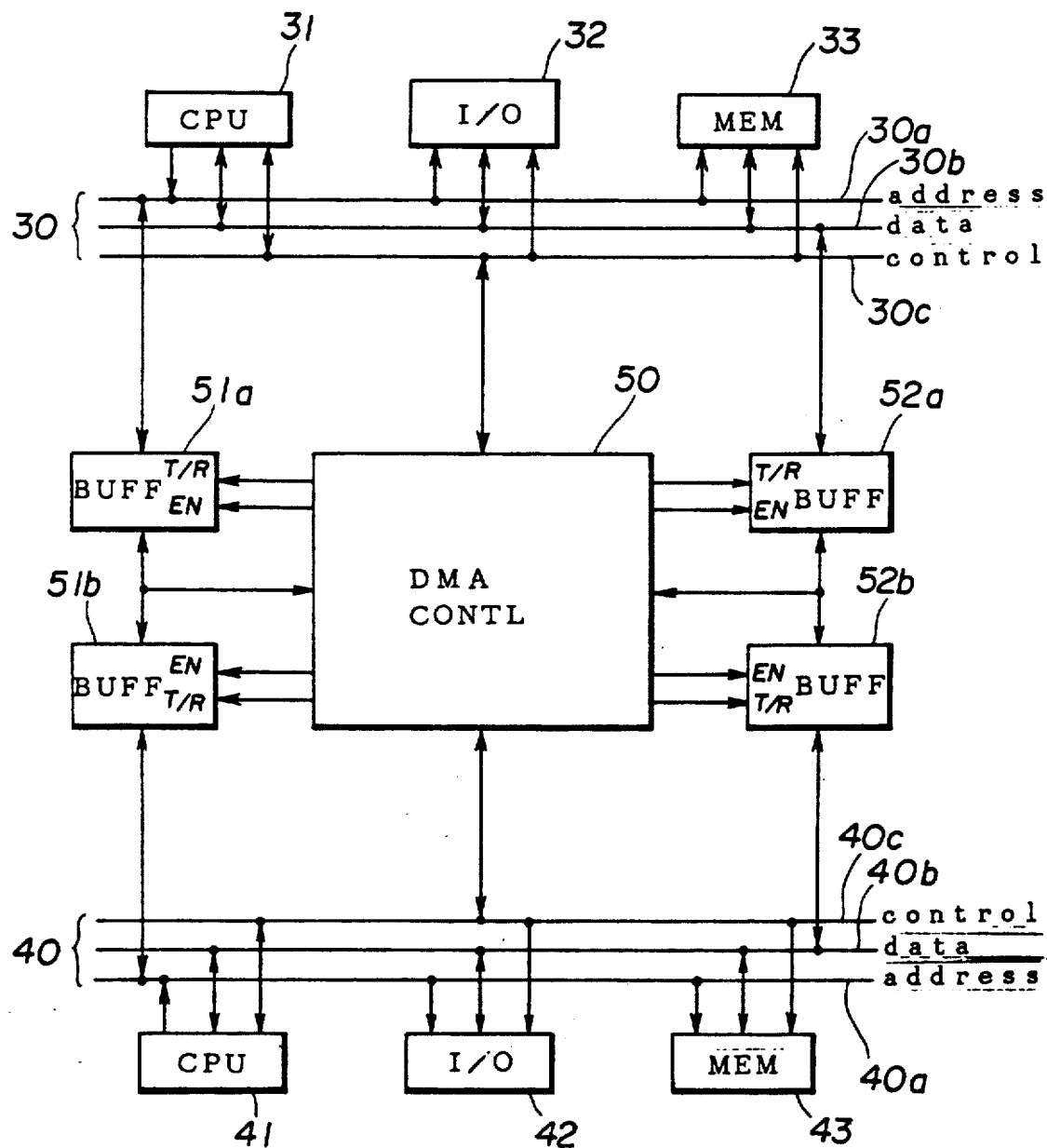
FIG. 8 is a system block diagram showing a data processing apparatus having a direct memory access controller to which the data transfer control system according to the present invention may be applied.

The data transfer control system according to the present invention is applicable to a direct memory access controller of a data processing apparatus shown in FIG. 8. In FIG. 8, a system bus 30 is made up of an address bus 30a, a data bus 30b and a control bus 30c. A CPU 31, an input/output interface 32 and a memory 33 are coupled to the system bus 30. Similarly, a system bus 40 is made up of an address bus 40a, a data bus 40b and a control bus 40c, and a CPU 41, an input/output interface 42 and a memory 43 are coupled to the system bus 40. A direct memory access (DMA) controller 50 is coupled directly to the control buses 30c and 40c. The DMA controller 50 is also coupled to the address buses 30a and 40a through respective bidirectional buffers 51a and 51b and to the data buses 30b and 40b through respective bidirectional buffers 52a and 52b. Each of the buffers 51a, 51b, 52a and 52b have a terminal EN and a terminal T/R. The ON/OFF State of each of the buffers 51a, 51b, 52a and 52b is controlled by a control signal which is supplied to the terminal EN from the DMA controller 50. In addition, a direction of the signal transfer through each of the buffers 51a, 51b, 52a and 52b is controlled by a control signal which is supplied to the terminal T/R from the DMA controller 50.

The data swap circuit 2 and the temporary register 4 shown in FIG. 1 are provided in a portion of the DMA controller 50 where data input and output are controlled. As a result, it is possible to freely control the data transfer between the input/output interfaces 32 and 42 and the memories 33 and 43.

Figure 9:
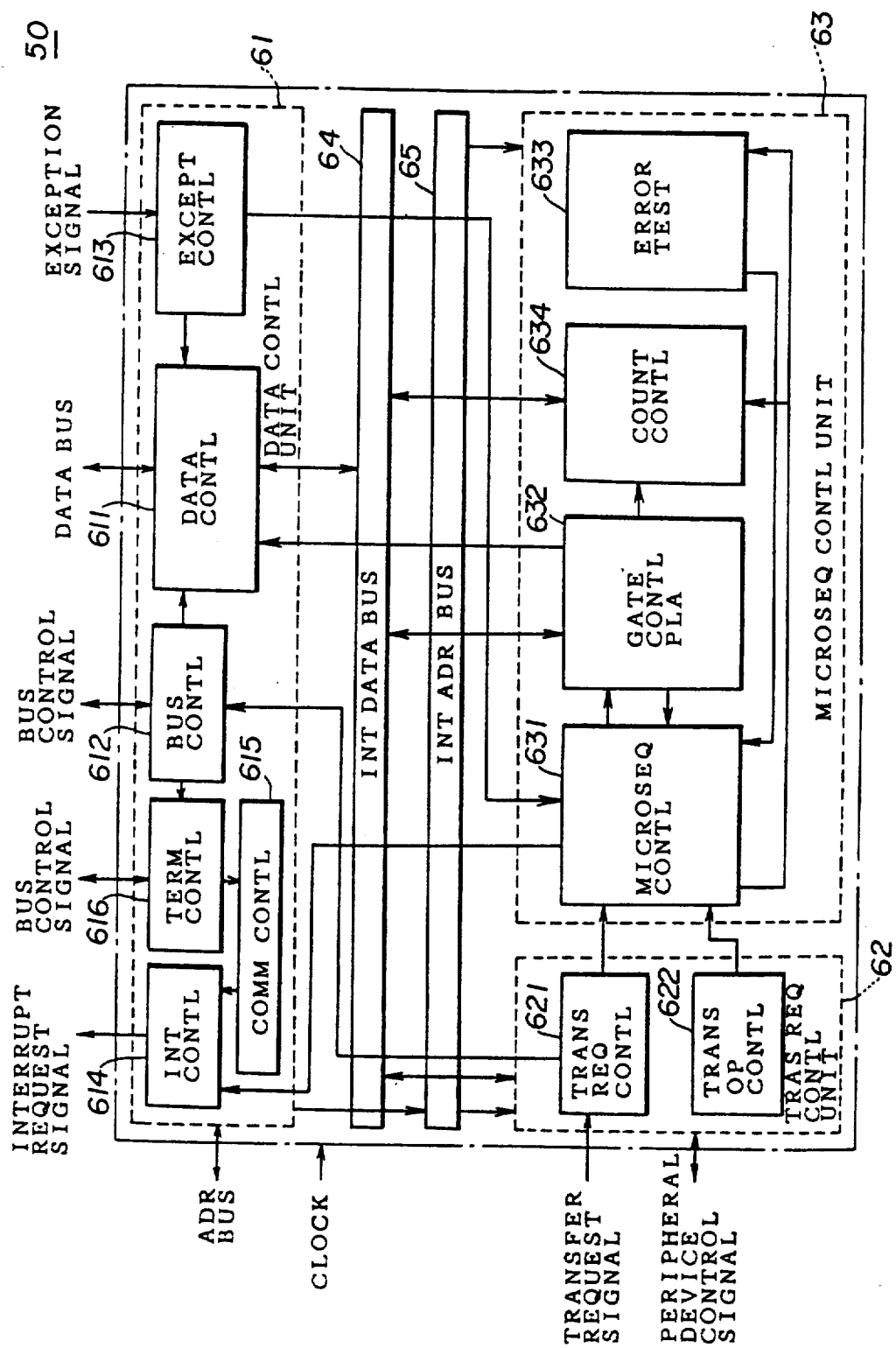
FIG. 9 is a system block diagram showing embodiment of the direct memory access controller shown in FIG. 8.

FIG. 9 shows an embodiment of the DMA controller 50. The DMA controller 50 has a data control unit 61, a transfer request control unit 62 and a microsequence control unit 63 which are coupled through an internal data bus 64 and an internal address bus 65.

The data control unit 61 controls the interface of the DMA controller 50 with respect to the CPUs 31 and 41, the input/output interfaces 32 and 42 and the memories 33 and 43. The data control unit 61 includes a data controller 611, a bus controller 612, an exception controller 613, an interrupt controller 614, a communication controller 615 and a terminal controller 616. The data controller 611 has a data holding register for holding a transfer data which is obtained through the data swap circuit 2, and makes it possible to interchange data in units of bytes during the data transfer. The bus controller 612 makes an arbitration of the right to use the system bus or buses when making the data transfer. The exception controller 613 carries out a control when an exception such as a bus error and a re-run occurs during the bus cycle. The interrupt controller 614 controls an interrupt request line and outputs an interrupt vector during an interrupt acknowledge cycle. The communication controller 615 controls the communication between the CPUs 31 and 41 which are respectively coupled to the system buses 30 and 40. The terminal controller 616 controls a control signal line, an external buffer control signal line and the like.

The transfer request control unit 62 has the function of making an arbitration of external and internal transfer requests, and includes a transfer request controller 621 and a transfer operation controller 622. The transfer request controller 621 makes an arbitration of external and internal transfer requests and reports a channel number in which a request exists to the data control unit 61 and the microsequence control unit 63. The transfer operation controller 622 controls a temporary stop, end and abort requests of the transfer operation or the like made from the CPU 31 or 41.

The microsequence control unit 63 executes microcommands which control the entire DMA controller 50. The microsequence control unit 63 includes a microsequence controller 631, a gate control PLA part 632, an error test part 633 and a counter controller 634. The microsequence controller 631 determines the address of a micro read only memory (ROM), reads out the contents of the micro ROM and distributes the read contents within the DMA controller 50. The gate control PLA part 632 reads out the contents of a PLA which stores the gate control information and the like which are used in the data swap circuit 2 during the data transfer, and distributes the read out contents within the DMA controller 50. The error test part 633 discriminates whether or not an error exists in the contents set in each of the registers before starting the data transfer. The counter controller 634 renews the transfer address and the number of bytes to be transferred.

The data swap circuit 2 and the temporary register 4 shown in FIG. 2 may be provided within the data controller 611 of the data control unit 61. In addition, the gate control circuit 23 of the data swap control circuit 5 may be a part of the gate control PLA part 632 of the microsequence control unit 63.

Further, the present invention is not limited to these embodiments, but various variations and modifications may be made without departing from the scope of the present invention.

What is claimed is:

1. A data transfer system for transferring data between a source means and a destination means by rearranging a data arrangement comprising data units, each of said data units comprising one or a plurality of bits, said data transfer system comprising:
   input/output means for inputting the data from the source means and for outputting the data to the destination means;
   a data swap circuit coupled to said input/output means for rearranging the data arrangement received from the source means through said input/output means and for rearranging the data arrangement outputted to the destination means through said input/output means in terms of the data units;
   a temporary register array for temporarily storing the rearranged data arrangement obtained from said data swap circuit; and
   a data swap control circuit coupled to said data swap circuit for controlling the rearranging of the data arrangement in said data swap circuit in response to a transfer information which includes at least a source address, a destination address and a transfer control information,
   said data swap control circuit controlling said data swap circuit to rearrange the data from the source means into a standard data arrangement comprising the data units to be stored in said temporary register array regardless of a start address of the data received from the source means and to supply to the destination means the data in the standard data arrangement stored in said temporary register array in a predetermined sequence in terms of the data units dependent on a start address of the data in the destination means.

2. The data transfer system as claimed in claim 1 wherein said temporary register comprises a plurality of registers, each register of said plurality of registers storing one data unit of the data received from the source means, said plurality of registers being equal to a number of the data units constituting the data received from the source means.

3. The data transfer system as claimed in claim 2 wherein said data swap circuit comprises a plurality of gate circuits which are coupled to said input/output means and to be a corresponding plurality of said registers, each of said gate circuits being controlled by an output control signal of said data swap control circuit so that one of said gate circuits becomes conductive depending on said standard arrangement.

4. The data transfer system as claimed in claim 1 wherein said data swap control circuit includes a gate control circuit which stores an arrangement information related to said standard arrangement and controls said data swap circuit depending on said arrangement information and said transfer information.

5. The data transfer system as claimed in claim 4 wherein said gate control circuit is constituted by a programmable logic array.

6. The data transfer system as claimed in claim 1 wherein the source means and the destination means are memories.

7. The data transfer system as claimed in claim 1 wherein one of the source means and the destination means is a memory and the other of the source means and the destination means is an input/output interface.

8. A data transfer system incorporated in a direct memory access controller for transferring data between a source means and a destination means by rearranging a data arrangement of data comprising data units, each of said data units being made up of one or a plurality of bits, said data transfer system comprising:
   input/output means for inputting the data from the source and for outputting the data to the destination means;
   a data swap circuit coupled to said input/output means for rearranging a data arrangement of the data received from the source through said input/output means in terms of the data units and for rearranging a data arrangement of the data outputted to the destination means through said input/output means in terms of the data units;

a temporary register array for temporarily storing the data with the rearranged data arrangement obtained from said data swap circuit; and a data swap control circuit coupled to said data swap circuit for controlling the rearranging of the data arrangement in said data swap circuit responsive to a transfer information which includes at least a source address, a destination address and a transfer control information, said data swap control circuit controlling said data swap circuit to rearrange the data from the source into a standard arrangement in terms of the data until to be stored in said temporary register array regardless of a start address of the data received from the source and to supply to the destination means the data in the standard arrangement stored in said temporary register array in a predetermined sequence in terms of the data until dependent on a start address of the data in the destination device.

9. The data transfer system as claimed in claim 8 wherein the direct memory access controller is connected to and controls direct memory access on a system bus to which at least a central processing unit, an input/output interface and a memory are coupled, said data swap control circuit of the direct memory access controller receiving said transfer information from the central processing unit.

10. The data transfer system as claimed in claim 8 wherein the direct memory access controller is connected to and controls direct memory access on two system buses wherein each system bus has at least a central processing unit, an input/output interface and a memory coupled thereto, said data swap control circuit of the direct memory access controller receiving said transfer information from the central processing unit.

11. A data transfer system for transferring data between a source means and a destination means by rearranging a data arrangement comprising data units, each of said data units comprising one or a plurality of bits, said data transfer system comprising:

input/output means for inputting the data from the source means and for outputting the data to the destination means;

a data swap circuit coupled to said input/output means for rearranging the data arrangement received from the source means through said input/output means and for rearranging the data arrangement outputted to the destination means through said input/output means in terms of the data units;

a temporary register array for temporarily storing the rearranged data arrangement obtained from said data swap circuit; and a data swap control circuit coupled to said data swap circuit for controlling the rearranging of the data arrangement in said data swap circuit in response to a transfer information which includes at least a source address, a destination address and a transfer control information, said data swap control circuit controlling said data swap circuit to rearrange the data from the source means into a standard data arrangement comprising the data units to be stored in said temporary register array regardless of a start address of the data received from the source means and to supply to the destination means the data in the standard data arrangement stored in said temporary register array in a predetermined sequence in terms of the data units dependent on a start address of the data in the destination means, wherein said data swap control circuit comprises a first register for storing the source and destination addresses for the rearranged data arrangement, a second register for storing the transfer control information for the rearranged data arrangement, a first holding circuit for holding a transfer frequency indicative of a number of times a data transfer is made, a second holding circuit for holding a transfer direction indicative of a direction in which the data transfer is made, a gate control circuit for controlling the addresses stored in said first register responsive to information obtained from said first and second registers and said first and second holding circuits, and means for outputting a control signal for controlling said data swap circuit responsive to an output of said gate control circuit.

12. The data transfer system as claimed in claim 11 wherein said gate control circuit is made up of a programmable logic array.

13. The data transfer system as claimed in claim 11 wherein said transfer control information includes a data length, a transfer mode and a transfer request signal.

14. A data transfer system incorporated in a direct memory access controller for transferring data between a source means and a destination means by rearranging a data arrangement of data comprising data units, each of said data units being made up of one or a plurality of bits, said data transfer system comprising:

input/output means for inputting the data from the source and for outputting the data to the destination means;

a data swap circuit coupled to said input/output means for rearranging a data arrangement of the data received from the source through said input/output means in terms of the data units and for rearranging a data arrangement of the data outputted to the destination means through said input/output means in terms of the data units;

a temporary register array for temporarily storing the data with the rearranged data arrangement obtained from said data swap circuit; and a data swap control circuit coupled to said data swap circuit for controlling the rearranging of the data arrangement in said data swap circuit responsive to a transfer information which includes at least a source address, a destination address and a transfer control information, said data swap control circuit controlling said data swap circuit to rearrange the data from the source into a standard arrangement in terms of the data until to be stored in said temporary register array regardless of a start address of the data received from the source and to supply to the destination means the data in the standard arrangement stored in said temporary register array in a predetermined sequence in terms of the data until dependent on a start address of the data in the destination means, wherein said data swap control circuit comprises a first register for storing the source and destination addresses for the rearranged data arrangement, a second register for storing the transfer control information for the rearranged data arrangement, a first holding circuit for holding a transfer frequency indicative of a number of times a data transfer is made, a second holding circuit for holding a transfer direction indicative of a direction in which the data transfer is made, a gate control circuit for controlling the addresses stored in said first register responsive to information obtained from said first and second registers and said first and second holding circuits, and means for outputting a control signal for controlling said data swap circuit responsive to an output of said gate control circuit.

* * * * *